United States Patent [19]

Yoshioka et al.

[11] Patent Number: 4,938,801
[45] Date of Patent: Jul. 3, 1990

[54] PRINTING INKS

[75] Inventors: Yoshioki Yoshioka; Kiyoe Hoshino; Shigeru Nakamura, all of Ibaraki, Japan

[73] Assignee: Taniguchi Ink Manufacturing Co., Ltd., Tokyo, Japan

[21] Appl. No.: 175,411

[22] Filed: Mar. 28, 1988

[30] Foreign Application Priority Data

Mar. 31, 1987 [JP] Japan ................................. 62-76250

[51] Int. Cl.$^5$ .............................................. C09D 11/06
[52] U.S. Cl. ........................................ 106/27; 106/20; 106/28; 106/29; 106/30; 106/22; 106/23; 524/77; 524/270; 524/611
[58] Field of Search ................... 106/20, 27, 28, 29, 106/30, 22, 23; 524/77, 270, 611, 600

[56] References Cited

U.S. PATENT DOCUMENTS 4,357,164 11/1982 Tsuji et al. ............................ 106/27

OTHER PUBLICATIONS

Derwent Abstract Accession No. 77-15729y/09, Japanese Patent No. 52008330, Jan. 22, 1977.
Derwent Abstract Accession No. 76-52747x/28, Japanese Patent No. 51059506, May 24, 1976.
Derwent Abstract Accession No. 85-034414/06, Japanese Patent No. 59227963, Dec. 20, 1984.

*Primary Examiner*—Amelia Burgess Yarbrough
*Attorney, Agent, or Firm*—Wenderoth, Lind & Ponack

[57] ABSTRACT

Printing inks comprising an oxidation polymerization type resin, at least a part of which sets to gel in a non-polar ink solvent, a color agent, and an ink solvent, at least a part of which being a non-volatile polar solvent. When the printing ink is applied onto an absorbent printing object, the non-volatile polar solvent is easily absorbed by the printing object to gel the oxidation polymerization type resin, thereby to allow the ink to dry quickly, whereas the ink on non-absorbent printing members of a printing machine does not dry easily.

2 Claims, No Drawings

PRINTING INKS

BACKGROUND OF THE INVENTION 1. (Field of the Invention)

This invention relates to printing inks, and more particularly to novel printing inks suitable for an absorbent printing object such as paper and having good drying characteristics and workability in printing.

2. (Description of the Prior Art)

Various types of printing inks used in printing patterns or designs on various printing objects such as paper and plastic film have been heretofore known.

As a printing ink used for non-absorbent printing objects such as a plastic film, metal and glass, there have been known solvent-evaporation type printing inks (e.g. photogravure ink) which are dried by evaporating the ink solvent contained therein.

For absorbent printing objects typified by paper, there have been used litho printing inks, intaglio printing inks, letterpress printing inks, silkscreen printing inks and so on, which are dried by causing the ink solvent contained therein to be absorbed by the absorbent printing object.

The printing inks as noted above are all used for printing by being applied to the face of the printing plate of a printing machine in accordance with a desired pattern form and transferred onto the printing object such as paper. The ink transferred onto the printing object is fixed thereon through the solvent evaporation, solvent absorption, oxidation polymerization of varnish, and other chemical actions.

Thus, the printing inks after being transferred onto the printing object is desired to dry as quickly as possible and has generally contrived to be quickly dried, but it is desirable that the printing ink during preservation or in printing does not easily dry. To satisfy the conflicting requirements, the printing ink has been controlled in drying characteristics.

Though there are some cases where printing operations are continuously carried out for hours, the printing operations in most cases are frequently interrupted even in the daytime and suspended during the night. In such cases, the printing ink applied onto the face of the printing plate or a bracket of the printing machine dries and sets up thereon when the good operation is stopped, because the printing ink has moderate drying characteristics as mentioned above.

When the printing ink dries and is fixed onto the face of the printing, it should be removed at the beginning of the next printing operation in order to obtain satisfactory printed matters.

The work of removing the hardened printing ink on the face of the printing plate is much harder and consumes much time, for example, one to two hours. During the work, the printing operation is obstructed. Furthermore, the work of removing the hardened ink requires many workers. Therefore, it can be said that the conventional printing inks are disadvantageous from the standpoint of economy.

Accordingly, there has been a great need for a printing ink which does not dry during preservation or when the printing operation is in preparation or suspended temporarily, but dry quickly after it is transferred to the face of the printing object.

Because the aforementioned requirements are antipodal, there has not been proposed so far any printing ink capable of fulfilling the requirements.

Thus, the conventional printing inks dry quickly and are hardened when being left on the printing plate or other component members of the printing machine for a long time, but do not easily dry when being applied onto the printing object. Therefore, when printed sheets are placed one over another immediately after the printing is completed, the ink applied onto the upper face of the printed sheet sticks easily to the lower face of the adjacent sheet in contact with the upper face of the printed sheet. Because of this, the printing ink applied onto the printing object is required to be forcibly dried, and a plurality of printed sheets should not be put one upon another just after being printed. In a case that the printed sheets must be placed on top of each other, troublesome work of, for example, spraying anti-sticking powder on the printed surface of the printing sheet is required.

OBJECT AND SUMMARY OF THE INVENTION

This invention aims at overcoming the aforementioned drawbacks suffered by the conventional printing inks. An object of this invention is to provide a printing ink which has sufficient fluidity and dry slowly when being preserved or applied onto the printing component members of a printing machine, so as not to dry and be hardened easily even after the printing machine is put out of operation during the night, and which can dry quickly on an absorbent printing object such as paper so that, when the printed matters onto which the printing ink is applied are put on top of each other, the ink applied onto the printed surface does not stick to the other printed object without need to spray anti-sticking powder on the printed surface of the printed object.

To attain the above object on the invention, there is provided a printing ink comprising an oxidation polymerization type resin, a coloring agent, and an ink solvent, at least a part of the oxidation polymerization type resin being a resin which sets to gel in a non-polar ink solvent, and at least a part of the ink solvent being a non-volatile polar solvent.

The printing ink according to this invention can maintain sufficient fluidity for a long period of time owing to the non-volatile solvent, when being preserved or applied onto non-absorbent members such as a printing plate in a printing machine, but can dry quickly when being applied onto an absorbent printing object such as paper because the oxidation polymerization type resin contained in the ink sets to gel at once as the non-volatile polar solvent is absorbed by the absorbent object.

The other objects and characteristics of the present invention will become apparent from the further disclosure to be made in the following description of preferred embodiments.

DETAILED DESCRIPTION OF THE PREFERRED EMBODIMENTS

One preferred embodiment of the printing ink according to this invention will now be described hereinafter.

The printing ink according to this invention comprises an oxidation polymerization type resin, a coloring agent, and an ink solvent. As the oxidation polymerization type resin used in the ink according to this invention, there may be used a mixture obtained by combining at the specific rate a drying oil such as a linseed oil and a semidrying oil such as a soja bean oil which are generally used as an ink for offset printing; an unsaturated aliphatic acid obtained from the aforesaid drying oil or semidrying oil; various denatured substances obtained by denaturing the aforesaid substances with acid, amine or alcohol; and a denatured synthetic resin such as phenolic resin, xylene resin and alkyd resin which are denatured with the drying oil, semidrying oil, unsaturated aliphatic acid or the like (hereinafter referred to simply as "conventional varnish"). Also, a resin which is obtained by further denaturing the conventional varnish with acid, amine or alcohol so as to gel in an ink solvent used commonly in a printing ink may be applied for the same purpose. "Gelation" termed herein designates the state in which the denatured resin as noted above lacks in fluidity in a non-polar ink solvent.

The conventional varnish to be used as a film-forming substance indispensable to a printing ink is per se required to have sufficient fluidity. The ink solvent used for an offset printing ink is of, for example, a non-polar petroleum solvent, i.e. an aliphatic hydrocarbon, aromatic hydrocarbon or a mixture thereof (hereinafter referred to as a non-polar solvent). In case where the varnish is denatured with acid, amine, alcohol or the like to exhibit sufficient fluidity in the non-polar ink solvent as noted above, the varnish is reduced in its affinity relative to the non-polar ink solvent to be gelatinized when the degree of denaturation is too high, thereby to be deprived of its fluidity. Therefore, the degree of denaturation thereof has conventionally been limited to a certain range as is well known.

The oxidation polymerization type resin used in this invention is primarily characterized in that at least a part thereof sets to gel in the non-polar ink solvent as mentioned above. One preferred example of the oxidation polymerization type resin is a mixture of an acid-denatured resin and an amine-denatured resin as used in a conventional printing ink. When the known acid-denatured resin and amine-denatured resin are together used in a mixture, it could not been so far expected from a conventional technique of printing inks that they set to gel in the non-polar ink solvent due to acid base bonding or hydrogen bonding brought about therebetween. Though the oxidation polymerization type resin does not set to gel under certain circumstances according to the mixing ratio thereof, this invention is not applicable to such a condition.

Next a second preferred embodiment of this invention will be described. In this embodiment, the oxidation polymerization type resin does not show fluidity in the non-polar ink solvent since the conventional varnish is subjected to acid-denaturation, amine-denaturation or alcohol denaturation to a high degree so as to set to gel. In the case of an acid-denatured resin, such a gelable resin can easily be produced by subjecting the conventional varnish to anti-denaturation so as to gel the varnish in the non-polar ink solvent through the agency of a polyvalent fatty acid such as maleic acid, fumaric acid and citric acid; a polyvalent carboxylic acid of polyvalent aromatic acid such as terephtalic acid, phthalic acid, isophthalic acid and trimellitic acid. In the case of an amine-denatured resin, the gelable resin is likewise produced by subjecting the conventional varnish to amine-denaturation so as to allow the varnish to gel in the non-polar ink solvent through the agency of a polyvalent amine such as higher aliphatic monoamine, ethylene diamine, propylene diamine, hexamethylene diamine, diethylene triamine, triethylene tetramine, tetraethylene pentamine, pentamethylene tetramine, tetramethylene diamine, or the like. Further, in the case of an alcohol-denatured resin (in this invention, epoxy-denaturation is also termed as alcohol-denaturation), the gelable resin is likewise obtained by subjecting the conventional varnish to alcohol-denaturation so as to gel the varnish in the non-polar ink solvent through the agency of a polyalcohol such as ethylene glycol, propylene glycol, trimethylolpropane, pentaerythritol or the like, or various kinds of epoxy resins, e.g. EPOMIC® R-140, R-301, R-304K and R-307 made by Mitsui Petrochemical Industries, Ltd. of Japan.

As mentioned above, the oxidation polymerization type resin in this invention sets to gel in the non-polar ink solvent, and therefore, cannot be used for a printing ink as it is. However, it was proved by the studies conducted by the inventors of this invention that the oxidation polymerization type resin capable of setting to gel in the non-polar ink solvent is prevented from gelatinizing to keep sufficient fluidity in an ink solvent by using a non-volatile polar solvent instead of all or part of the non-polar ink solvent. The oxidation polymerization type resin which acquires fluidity owing to the non-volatile polar solvent as mentioned above can maintain sufficient fluidity in a container or on non-absorbent printing members such as a printing plate in a printing machine. On the contrary, when the oxidation polymerization type resin is applied onto an absorbent printing object such as paper, it is absorbed by the printing object to decrease the ink solvent in quantity in the printing ink, whereby the printing ink sets to gel in an instant and dries quickly.

Specifically in the case of using as the ink solvent the non-polar ink solvent and the non-volatile polar solvent in combination, the non-volatile polar solvent contained in the combined ink solvents is first absorbed by a sheet of paper having hydrophilic nature to thereby increase the concentration of the non-polar solvent in the ink solvents, with the result that the gelable resin sets easily to gel and dries well on the sheet of paper.

As is apparent from the foregoing, the resin which sets to gel in the non-polar ink solvent may be used together with all sorts of oxidation polymerization type resins or the conventional varnish. When the gelable resin is used with the conventional varnish, it should preferably be determined to 10 or more percent by weight of the varnish in total amount. If the gelable resin is less than 10 percent by weight, the printing ink applied onto the sheet of paper does not sufficiently dry and causes other printing paper placed on the printed paper applied with the ink to be stained with the damp-dry ink on the printed paper.

The usage volume of the oxidation polymerization type resin is generally about 50 to 80 parts by weight relative to 100 parts by weight of the printing ink.

The non-volatile polar solvent used in this invention assumes a non-volatile state at the normal temperature. For example, solvents of groups, which bring about acid base reaction or hydrogen bonding, such as carboxyl group, amino group, hydroxyl group, ether group, and amide group may be used as the non-volatile polar solvent. To be concrete, there may be used therefor conventionally known polar solvents such as fluid or unsaturated aliphatic acid belonging to C5 or above, liquid aliphatic amine such as aliphatic monoamine, ethylene diamine, propylene diamine, and alkyl derivatives thereof; polyalcohol such as aliphatic alcohol of C5 or above, ethylene glycol, diethylene glycol, propylene glycol, alcohol ether thereof, aliphatic ether, glycerine, trimethylolpropane, and pentaerythritol; and other solvents including ketone such as cyclohexanone, ester and amide.

The non-polar ink solvent which can be used together with the above-mentioned non-volatile polar solvent is a well-known petroleum isoqui-solvent which has been conventionally used for offset printing. When the non-polar ink solvent and the non-volatile polar solvent are used in a mixture, the proportion in which the oxidation polymerization type resin, non-polar ink solvent, and non-volatile polar solvent are mixed cannot simply be determined because it varies case by case with a combination of the aforesaid components. However, moderate proportion in which the components are mixed can be readily determined by adding little by little the non-volatile polar solvent into the mixed non-polar ink solvent and oxidation polymerization type resin (which of course assumes the gelatinized state) until desired fluidity is obtained according to demand. That is, the non-volatile polar solvent more in quantity than that by which the desired fluidity can be obtained may preferably be added thereto.

The coloring agent used in the printing ink according to this invention may be pigments or dyes which have been used for conventional printing inks. The known pigments and dyes can be applied to this invention as they are. The usage volume of the coloring agent may be determined likewise the conventional printing ink. For example, there has generally been used about 10 to 40 parts by weight of the coloring agent relative to 100 parts by weight of the printing ink.

The printing ink of this invention mainly comprises the aforementioned oxidation polymerization type resin, coloring agent and ink solvent, and furthermore are of course mixed with other drying agents, leveling improvers, thickening agents, anti-skinning agents and/or other known additives.

As the drying agents, there are used naphthenic acid of polyvalent metal such as cobalt, manganese, cerium, zirconium, lead, iron, zinc, copper, vanadium, barium and calcium, octyl acid, resin acid, tall oil fatty acid, oil-soluble carboxylic acid and salt of the resin acid. These drying agents are generally used in the ration of about 0.005 to 0.5 percent by weight of metal per 100 parts by weight of the printing ink.

The printing ink of the present invention per se may be reproduced by adequately mixing the aforementioned components constituting the ink by a conventional mixing method. However, the mixing method should not be understood as limitative. For instance, there may be adopted a mixing method comprising mixture a fluid varnish containing the conventionally known oxidation polymerization type resin with a resin or varnish of different type so as to allow the fluid varnish to be positively gelatinized, and thereafter, adding a non-volatile polar solvent to the mixture so as to acquire sufficient fluidity.

As is apparent from the above, the printing ink according to this invention can sufficiently maintain its fluidity for a long period because the ink solvent contained in the printing ink does not disappear in a non-absorbent container or on the printing members of a printing machine. If the printing operation is suspended, the printing ink applied onto the printing members of the printing machine does not gelatinize and harden. Therefore, the printing operation can start without cleaning the printing members of the printing machine after a while. Thus, the printing ink according to this invention can eliminate the drawback in this respect suffered from the common printing ink.

On the other hand, when the printing ink is applied onto an absorbant printing object such as paper, the non-volatile polar solvent contained in the printing ink is easily absorbed, and consequently, the oxidation polymerization type resin in the printing ink immediately set to gel and dries quickly. Therefore, if the printed objects are placed one on top of another just after printing, the each printed object is not stained with the printing ink applied onto the adjacent printing object unless the printed object is forcibly dried or sprayed with anti-sticking powder. Thus, the problem of workability after printing can be overcome completely.

Next the present invention will be concretely explained by giving some examples as described below.

[EXAMPLE 1]

3070 parts by weight of linseed oil and 490 parts by weight of tall oil fatty acid were together heated, thereby to obtain an acid-denatured oil of Gardner viscosity index X (25° C.) and acid value 34.2 (KOH mg/g). 625 parts by weight of the acid-denatured oil thus obtained and 13.8 parts by weight of hexamethylenediamine were together heated in the presence of xylene to distill 4.3 parts by weight of water, consequently to obtain an amine-denatured drying oil of Gardner viscosity index Z5 or above and acid value of 16.4. The drying oil thus obtained does not show sufficient fluidity since it sets to gel in Nisseki #5 solvent made by Nippon Oil Co., Ltd. of Japan at the normal temperature.

300 parts by weight of the obtained amine-denatured drying oil, 300 parts by weight of phenol-denatured, rosin-having the flex temperature of 163° C. and acid value of 22.6, and 150 parts by weight of Nisseki #5 solvent were heated at 200° C. for one hour to be liquefied and further mixed with 150 parts by weight of butyl-carbitol to obtain a varnish.

700 parts by weight of the varnish thus obtained and 200 parts by weight of phthalocyanine blue were kneaded with three mixing rolls and further mixed with 5 parts by weight of octyl-acid manganese containing 8 wt % of manganese, 50 parts by weight of Nisseki #5 solvent, and 80 parts by weight of ethyl cellosolve. Thus, an offset printing ink showing tack value 9.8 of an inkometer (400 rpm) was obtained.

The set time of the printing ink thus obtained and applied onto coated paper (art paper) was measured to only 90 seconds according to the JIS method (JIS K-5701). Printing on the coated papers was carried out at a printing speed of 6000 rph by use of a printing machine made by Roland Praktika without applying anti-sticking spray powder and the printed papers up to 3000 were piled up. As a result of checking whether some printed papers picked out from the lower part of the piled papers are stained with inks applied onto other papers, no paper was at all stained with the ink applied onto the other papers without adopting anti-sticking spray powder. Even when 3000 additional printed papers were further put on the piled printed papers, no paper stained with the ink applied onto the printed surface of the other papers was found.

[EXAMPLE 2]

3000 parts by weight of linseed oil and 120 parts by weight of tall oil fatty acid were together heated to obtain an acid-denatured oil of Gardner viscosity index R and acid value 13.5. 1040 parts by weight of the acid-denatured oil thus obtained and 17.5 parts by weight of hexamethylene diamine were heated in the presence of xylene to distill 4.5 parts by weight of water, thereby to obtain an amine-denatured drying oil of amine value 2.9 ($CH_3COOH$ mg/g).

The amine-denatured drying oil thus obtained was heated with 50 parts by weight of the amine-denatured drying oil used in Example 1 described above to be liquefied and further mixed with 100 parts by weight of tall oil fatty acid, 100 parts by weight of butyl-carbitol, and 30 parts by butyl-carbitol, the resin comprising 130 parts by weight of Nisseki #5 solvent came into gel and lost its fluidity.

700 parts by weight of the varnish thus obtained and 200 parts by weight of carbon black were kneaded with three mixing rolls and further mixed with 5 parts by weight of octyl-acid manganese containing 8 wt % of manganese and 60 parts by weight of butyl-carbitol, to obtain an offset printing ink showing tack value 9.6.

As a result of the test which was conducted by the same method as in Example 1, the set time of the obtained printing ink was measured to 150 seconds. Though 3000 printed papers were piled, no printed paper was stained with the ink applied onto other printed papers without spraying anti-sticking powder. Also when 3000 printed papers were further put on the piled papers, no paper stained with the ink applied onto the other papers was found at all.

[EXAMPLE 3]

400 parts by weight of phenol-denatured rosin having the flex temperature of 171° C. and acid value of 17.0 and 200 parts by weight cf Nisseki #5 solvent were heated at 220° C. to be liquefied and mixed with 200 parts by weight of butylcarbitol, and thereafter, further mixed with 50 parts by weight of amine-denatured drying oil being 2.9 in amine value, thereby to obtain a varnish. In this case, the resin comprising 200 parts by weight of Nisseki #5 solvent without butyl-carbitol was gelatinized to lose its fluidity.

650 parts by weight of the varnish thus obtained and 180 parts by weight of brilliant carmine 7B were kneaded with three mixing rolls and further mixed with 5 parts by weight of octyl-acid manganese containing 8 wt % of manganese and 150 parts by weight of castor-oil aliphatic acid, to obtain a printing ink being 10.2 in tack value.

As a result of the test which was conducted in the same manner as in Example 1, the set time of the obtained printing ink was measured to 60 seconds and no printed paper stained with the ink applied onto the other papers was found without using anti-sticking spray powder when 3000 printed papers were piled and further, 3000 printed papers were additionally put on the piled printed papers.

[EXAMPLE 4]

3000 parts by weight of linseed oil and 185 parts by weight of glycerine were heated until the viscosity thereof become index G, and heated with 500 parts by weight of isophthalic acid in the presence of xylene to distill 105 g of water, consequently to obtain a drying oil-denatured alkyd resin having viscosity index Z and acid-value 16.3.

3000 parts by weight of linseed oil and 120 parts by weight of tall oil fatty acid were heated to obtain an acid-denatured drying oil of viscosity index X and acid value 13.5. 1050 parts by weight of the acid-denatured drying oil thus obtained and 29 parts by weight of hexamethylenediamine were heated in the presence of xylene to distill 4.5 parts by weight of water, consequently to obtain an amine-denatured drying oil of viscosity index Z or above and amine value 12.9.

Thereafter, 3000 parts by weight of drying oil-denatured alkyd resin, 100 parts by weight of phenol-denatured rosin, and 100 parts by weight of Nisseki #5 solvent were heated at 200° C. to be liquefied, and mixed with 100 parts by weight of lauryl ethylamine and further with 30 parts by weight of amine-denatured drying oil of amine value 12.9 and 200 parts by weight of ethyl-carbitol, consequently to obtain a varnish. In this case, without ethyl-carbitol, the obtained resin comprising 200 parts by weight of Nisseki #5 solvent came into gel and lost its fluidity.

700 parts by weight of the varnish thus obtained and 200 parts by weight of phthalocyanine blue were kneaded with three mixing rolls and mixed with 5 parts by weight of octyl-acid manganese containing 8 wt % of manganese, 20 parts by weight of Nisseki #5 solvent and 70 parts by weight of butyl-carbitol to obtain a printing ink being 10.0 in tack value.

As a result of the test which was conducted in the same manner as in Example 1, the set time of the obtained printing ink was measured to 70 seconds and it was found that no printed paper was stained with the ink applied onto other printed papers when 3000 printed papers were piled without spraying anti-sticking powder on the printed surfaces of the papers, and further the same result was obtained when 3000 additional printed papers were further put on top of the piled papers.

[EXAMPLE 5]

3000 parts by weight of linseed oil and 250 parts by weight of pentaerythritol were heated at 280° C. to obtain an alcohol-denatured oil of viscosity index Z or above.

500 parts by weight of the oil thus obtained, 200 parts by weight of phenol-denatured rosin, and 100 parts by weight of Nisseki #5 solvent were heated at 200° C. to be liquefied, and thereafter, mixed with 200 parts by weight of cellosolve to obtain a varnish. In this case, when using 300 parts by weight of Nisseki #5 solvent instead of the cellosolve, the obtained resin came into gel and lost its fluidity.

700 parts by weight of the varnish thus obtained and 200 parts by weight of brilliant carmine 7B were kneaded with three mixing rolls and mixed with 5 parts by weight of octyl-acid manganese containing 8 wt % of manganese and 75 parts by weight of ethyl-carbitol acetate, consequently to obtain a printing ink being 9.8 in tack value.

As a result of the test which was conducted in the same manner as in Example 1, the set time of the obtained printing ink was measured to 210 seconds and it was found that no printed paper was stained with the ink applied onto other printed papers when 3000 printed papers were piled without spraying anti-sticking powder on the printed surfaces of the papers, and further, the same result was obtained when 3000 additional printed papers were further put on top of the piled papers.

[EXAMPLE 6]

3070 parts by weight of linseed oil and 120 parts by weight of tall oil fatty acid were heated to obtain an acid-denatured oil of Gardner viscosity index J and acid value 13.0. The acid-denatured oil thus obtained was heated with 30 parts by weight of tetraethylene pentamine in the presence of xylene to distill 13.0 parts by weight of water, consequently to, obtain an amine-denatured drying oil being 2.6 in amine value ($CH_3COOH$ mg/g).

2800 parts by weight of the obtained amine-denatured drying oil, 300 parts by weight of phenol-denatured rosin, and 300 parts by weight of Nisseki #5 solvent were heated to be liquefied, consequently to obtain a varnish. The varnish thus obtained was in a gel state and reduced in fluidity.

300 parts by weight of the varnish thus obtained, 100 parts by weight of brilliant carmine 7B, and 50 parts by weight of diethylene glycol acetate were kneaded with three mixing rolls and further mixed with 2.5 parts by weight of octyl-acid manganese containing 8 wt % of manganese and 125 parts by weight of diethylene glycol monoacetate, thereby to obtain an offset printing ink being 7.9 in tack value.

As a result of the test which was conducted in the same manner as in Example 1, the set time of the obtained printing ink was measured to 120 seconds and it was found that no printed paper was stained with the ink applied onto other printed papers when 3000 printed papers were piled without spraying anti-sticking powder on the printed surfaces of the papers, and further, the same result was obtained when 3000 additional printed papers were further put on top of the piled papers.

[EXAMPLES 7 to 13]

In these examples, various sorts of polar solvents were used instead of diethylene glycol monoacetate used in Example 6 noted above so as to regulate the properties of the printing ink and will be described below along with the results obtained in each example.

[Example 7]
Solvent: Diethylene glycol diacetate
Tack value: 6.5
Set time: 210 seconds
Ink stain in 3000 piled printed papers: Non
[Example 8]
Solvent: Tributyl phosphate
Tack value: 6.8
Set time: 195 seconds
Ink stain in 3000 piled printed papers: Non
[Example 9]
Solvent: Castor oil fatty acid
Tack value: 6.6
Set time: 180 seconds
Ink stain in 3000 piled printed papers: Non
[Example 10]
Solvent: Tall oil fatty acid
Tack value: 6.6
Set time: 180 seconds
Ink stain in 3000 piled printed papers: Non
[Example 11]
Solvent: 2-hydroxyethyl octylamine
Tack value: 6.4
Set time: 195 seconds
Ink stain in 3000 piled printed papers: Non
[Example 12]
Solvent: Dibutyl phthalate
Tack value: 6.7
Set time: 165 seconds
Ink stain in 3000 piled printed papers: Non
[Example 13]
Solvent: Dioctyl phthalate
Tack value: 7.0
Set time: 225 seconds
Ink stain in 3000 piled printed papers: Non

[EXAMPLE 14]

3070 parts by weight of linseed oil and 490 parts by weight of tall oil fatty acid were together heated, thereby to obtain an acid-denatured oil of viscosity index X and acid value 34.2. 1600 parts by weight of the acid-denatured oil thus obtained and 94 parts by weight of epoxy resin R-140 were together heated in the presence of xylene to distill 7 parts by weight of water, consequently to obtain an epoxy-denatured drying oil of viscosity index G and acid value of 9.0.

300 parts by weight of the obtained epoxy-denatured drying oil, 300 parts by weight of phenol-denatured rosin having the flex temperature of 163° C. and acid value of 22.6, and 280 parts by weight of Nisseki #5 solvent were heated at 200° C. for one hour to be liquefied and further mixed with 20 parts by weight of butylcarbitol to obtain a varnish.

700 parts by weight of the varnish thus obtained and 200 parts by weight of phthalocyanine blue were kneaded with three mixing rolls and further mixed with 5 parts by weight of octyl-acid manganese containing 8 wt % of manganese, 100 parts by weight of Nisseki #5 solvent, and 80 parts by weight of ethyl cellosolve, consequently to obtain an offset printing ink showing tack value 9.8.

As a result of the test which was conducted in the same manner as in Example 1, the set time of the obtained printing ink was measured to 180 seconds and it was found that no printed paper was stained with the ink applied onto other printed papers when 3000 printed papers were piled without spraying anti-sticking powder on the printed surfaces of the papers, and further, the same result was obtained when 3000 additional printed papers were further put on top of the piled papers.

[EXAMPLE 15]

3000 parts by weight of linseed oil and 120 parts by weight of tall oil fatty acid were together heated, thereby to obtain an acid-denatured oil of viscosity index X and acid value 13.5. 2080 parts by weight of the acid-denatured oil thus obtained and 80 parts by weight of epoxy resin R-301 were together heated in the presence of xylene to distill 14 parts by weight of water, consequently to obtain an epoxy-denatured drying oil of viscosity index E and acid value of 9.0.

300 parts by weight of the obtained epoxy-denatured drying oil, 300 parts by weight of phenol-denatured rosin having the flex temperature of 163° C. and acid value of 22.6, and 200 parts by weight of Nisseki #5 solvent were heated at 200° C. for one hour to be liquefied and further mixed with 50 parts by weight of cellosolve butyrate to obtain a varnish.

700 parts by weight of the varnish thus obtained and 200 parts by weight of phthalocyanine blue were kneaded with three mixing rolls and further mixed with 5 parts by weight of octyl-acid manganese containing 8 wt % of manganese, 100 parts by weight of Nisseki #5 solvent, and 10 parts by weight of cellosolve acetate, consequently to obtain an offset printing ink showing tack value 9.8.

As a result of the test which was conducted in the same manner as in Example 1, the set time of the obtained printing ink was measured to 195 seconds and it was found that no printed paper was stained with the ink applied onto other printed papers when 3000 printed papers were piled without spraying anti-sticking powder on the printed surfaces of the papers, and further, the same result was obtained when 3000 additional printed papers were further put on top of the piled papers.

[EXAMPLE 16]

3000 parts by weight of linseed oil and 120 parts by weight of tall oil fatty acid were together heated, thereby to obtain an acid-denatured oil of viscosity index X and acid value 13.5. 1640 parts by weight of the acid-denatured oil thus obtained and 387 parts by weight of epoxy resin R-307 were together heated in the presence of xylene to distill 12 parts by weight of water, consequently to obtain an epoxy-denatured drying oil of viscosity index W and acid value of 8.6.

300 parts by weight of the obtained epoxy-denatured drying oil, 300 parts by weight of phenol-denatured rosin having the flex temperature of 163° C. and acid value of 22.6, and 280 parts by weight of Nisseki #5 solvent were heated at 200° C. for one hour to be liquefied and further mixed with 20 parts by weight of cellosolve butyrate to obtain a varnish.

700 parts by weight of the varnish thus obtained and 200 parts by weight of phthalocyanine blue were kneaded with three mixing rolls and further mixed with 5 parts by weight of octyl-acid manganese containing 8 wt % of manganese, 150 parts by weight of Nisseki #5 solvent, and 60 parts by weight of cellosolve acetate, consequently to obtain an offset printing ink showing tack value 9.8.

As a result of the test which was conducted in the same manner as in Example 1, the set time of the obtained printing ink was measured to 210 seconds and it was found that no printed paper was stained with the ink applied onto other printed papers when 3000 printed papers were piled without spraying anti-sticking powder on the printed surfaces of the papers, and further, the same result was obtained when 3000 additional printed papers were further put on top of the piled papers.

The following solvents can be effectively used instead of polar solvents in the examples described above.

Tributyl phosphate, triphenyl phosphate, diethyl phthalate, dipropyl phthalate, dibutyl phthalate, dihexyl phthalate, dioctyl phthalate, diethylene glycol monomethyl ether, diethylene glycol monoethyl ether, diethylene glycol monobutyl ether, diethylene glycol diethyl ether, diethylene glycol monoethyl ether monoacetate, ethylene glycol monoacetate, diethylene glycol monoacetate, triethylene glycol monoacetate, ethylene glycol diacetate, diethylene glycol diacetate, triethylene glycol diacetate, capric acid, caproic acid, caprylic acid, decanoic acid, lauric acid, oleic acid, tall oil fatty acid, castor oil fatty acid, linoleic acid, linolenic acid, laurylamine, 2-hydroxyethyl laurylamine, 2-hydroxyethyl octylamine, bis(2-hydroxyethyl) octylamine, bis(2-hydroxyethyl) hexylamine, and 2-hydroxyethyl cyclohexylamine.

[COMPARATIVE EXAMPLE 1]

300 parts by weight of heat-polymerized linseed oil of viscosity index X and acid value 11.3, 300 parts by weight of phenol-denatured rosin having the flex temperature of 163° C., and 200 parts by weight of Nisseki #5 solvent were heated at 200° C. for one hour to be liquefied, consequently to obtain a varnish. The varnish thus obtained had sufficient fluidity at the normal temperature.

700 parts by weight of varnish thus obtained and 200 parts by weight of phthalocyanine blue were kneaded with three mixing rolls and mixed with 5 parts by weight of octyl-acid manganese containing 8 wt % of manganese and 95 parts by weight of Nisseki #5 solvent, consequently to obtain a printing ink being 10.2 in tack value.

As a result of the test which was conducted in the same manner as in Example 1, the set time of this ink was measured to 420 seconds and the printed papers were remarkably stained with the ink applied onto other printed papers when 3000 printed papers were piled without spraying anti-sticking powder on the printed surface of the printed papers.

[COMPARATIVE EXAMPLE 2]

300 parts by weight of drying oil-denatured alkyd as used in Example 4 described early, 300 parts by weight of phenol-denatured rosin, and 300 parts by weight of Nisseki #5 solvent were heated to be liquefied, consequently to obtain a varnish. The varnish thus obtained had sufficient fluidity at the normal temperature.

700 parts by weight of the varnish thus obtained and 200 parts by weight of phthalocyanine blue were kneaded with three mixing rolls and further mixed with 5 parts by weight of octyl-acid manganese containing 8 wt % of manganese and 80 parts by weight of Nisseki #5 solvent, consequently to obtain a printing ink being 9.8 in tack value.

As a result of the test which was conducted in the same manner as in Example 1, the set time of this ink was measured to 360 seconds and the printed papers were remarkably stained with the ink applied onto other printed papers when 3000 printed papers were piled without spraying anti-sticking powder on the printed surface of the printed papers.

Although particular embodiments are described hereinbefore, it is apparent to those skilled in the art that those embodiments can be modified without departing from the spirit of this invention.

What is claimed is:

1. A printing ink for offset printing comprising an oxidation polymerization resin, a coloring agent, and an ink solvent, at least a part of said oxidation polymerization resin being an amine-denatured resin which sets to a gel in a non-polar ink solvent, and at least a part of said ink solvent being a non-volatile polar solvent.

2. A printing ink for offset printing comprising an oxidation polymerization resin, a coloring agent, and an ink solvent, at least a part of said oxidation polymerization resin being an alcohol-denatured resin which sets to a gel in a non-polar ink solvent, and at least a part of said ink solvent being a non-volatile polar solvent.

* * * * *